Figure 1:
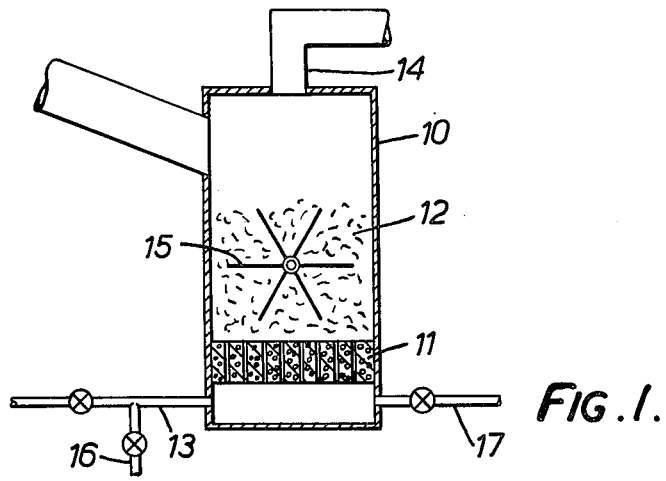

United States Patent [19]

Corbett et al.

[11] 4,082,860
[45] Apr. 4, 1978

[54] ELECTROSTATIC DEPOSITION OF FINE VITREOUS ENAMEL

[75] Inventors: Roger Patrick Corbett, Bassett; Trevor Robert Gilson, Hythe; Terence Patrick Nealon, Cardiff; Patrick John Hendra, Crawley, near Winchester, all of England

[73] Assignee: Edward Curran Engineering Limited, Cardiff, England

[21] Appl. No.: 558,453

[22] Filed: Mar. 14, 1975

[51] Int. Cl.² .............................................. B05B 5/02
[52] U.S. Cl. ...................................... 427/27; 427/193; 427/337; 427/375
[58] Field of Search ............... 427/375, 337, 13, 193, 427/27; 96/1.0; 252/62.1

[56] References Cited

U.S. PATENT DOCUMENTS

| 3,632,434 | 1/1972 | Hutson | 427/93 |
| 3,669,693 | 6/1972 | Dalton et al. | 427/93 X |
| 3,819,367 | 6/1974 | Chatterji et al. | 96/1 |
| 3,833,366 | 9/1974 | Madrid | 96/1 |
| 3,840,464 | 10/1974 | Van Engeland et al. | 252/62.1 |

*Primary Examiner*—Bernard D. Pianalto
*Attorney, Agent, or Firm*—Young & Thompson

[57] ABSTRACT

The invention provides a powder of fine semiconducting vitreous enamelling particles, such as alkali-boro silicate glass frit, especially applicable to an electrostatic powder coating process, for providing improved electrostatic adhesion to a base metallic surface. The preferred powder treatment is to expose the dried powder to tri-chloro-silane vapor which reacts with the hydroxyl surface groups on the particles to form a surface layer which is then exposed to water vapor producing a hydrophobic cross-linked silicone structure. In the final firing stage of the enamelling process excess organic groups are driven off, and the enamel is not contaminated.

4 Claims, 9 Drawing Figures

ELECTROSTATIC DEPOSITION OF FINE VITREOUS ENAMEL

This invention relates to methods and apparatus for the electrostatic deposition of powdered vitreous enamel materials on to articles to be coated, and also to the powdered materials to be used therein.

It is well known that charged particles subject to an electric field will migrate in the field to an electrode or surface of opposite polarity and this phenomenon is widely used in electrostatic powder coating techniques. If the powder particles are of low conductivity, i.e., high resistivity, they maintain their charge for prolonged periods and the particles form a surface layer on the article to be coated, providing substantial adhesion and a repulsion effect which tends to automatically limit the coating thickness to a constant value over the surface of the article to be coated. However, if the particles are of high conductivity, or low resistivity, they rapidly lose their charge by conduction to the surface and consequently the adhesion is lost and the particles actually bounce off the surface due to the electrical forces acting on the particles. With particles whose conductivity is intermediate, hereinafter referred to as "semi-conducting", the particle charge will be lost to the surface at an intermediate rate but generally speaking the effect is similar to that of conducting powders and the deposited layer of powder on the surface will not adhere satisfactorily, or not for any appreciable time interval during the handling of the material in production, nor is there any automatic thickness limiting mechanism.

The phenomenon of adhesion is in fact considerably more complicated than might be suggested by the above description. There are several constituent forces involved, not all of which are clearly understood at this time but which include the so-called Van der Waal's forces, the meniscus forces caused by any absorbed moisture in the surface layers of the particles, and the so-called electric double layer forces in the contact regions between individual particles as well as the electrostatic force between the charged particle and its mirror image behind the metal substrate. The adhesive force is in practice related to the particle size and the strength of the electric field and the applied voltage and current, amongst other factors.

For the purposes of the present invention the limits of semi-conductivity will be defined as a resistivity of between about $10^9$ and $10^{12}$ ohm meters. For resistivities above this value range the material will be treated herein as a non-conductor, and below this value range as a true conductor. The conductivity of this range of semi-conducting materials may be expressed as between $10^{-7}$ to $10^{-10}$ mhos/cm.

Little difficulty is experienced in applying powdered layers of low-conductivity material. The non-conducting particles are readily charged and retain their charge when in contact with the conducting surface to be coated. However, for semi-conducting and conducting powdered materials considerable difficulties are experienced in achieving an adhesive powder coating as mentioned above, and a uniform coating thickness. Various proposals have been made for alleviating these difficulties, more especially for use with conducting metal powders, but these prior proposals have not been applicable to semi-conducting powders, such as vitreous enamel powders, and it is a primary object of the present invention to provide an improved method of applying electrostatically a semi-conducting powder coating, and a powdered material for use therein, which will at least partly overcome some of these existing problems.

Broadly stated from one aspect the invention provides a method of applying a coating of fine vitreous enamelling particles to a conducting surface, in which a powder comprising small enamelling particles, each provided with a surface treatment or coating to give increased surface resistivity, is charged and subjected to an electric field, causing the particles to migrate towards and/or adhere to the conducting surface.

From another aspect the invention provides a method of manufacturing a powder for use in an electrostatic powder coating process, in which small semi-conducting vitreous enamelling particles are coated or surface treated to give increased surface resistivity.

The invention also provides a vitreous enamelling powder for use in an electrostatic powder coating process, comprising a mass of fine particles of a vitreous enamelling frit, each coated or surface treated to provide increased surface resistivity.

The invention is particularly applicable to powders in which the majority of the particles have a size not greater than $200\mu$. For some powder coating applications the particle size may be as low as $5\mu$ to $25\mu$. Powdered glass frit as used for vitreous enamelling is of appreciable conductivity, within the semi-conducting range, and it is extremely difficult to achieve an adherent powder coating without the use of liquid bonding agents which complicate the subsequent firing processes of the enamelling operation. By means of the present invention, however, a dry powder coating can be achieved with excellent adhesion and uniformity of coating thickness typical of a non-conducting material.

In a particular preferred form of the invention the surface of the particles is initially hydrophilic and is modified by chemical removal of surface groups (e.g., hydroxyl groups) and replacement by hydrophobic material. In a particular preferred form of the invention the treated surface layer comprises a cross-linked silicone material.

In any case, the surface coating or treated layer is preferably such that the constituents will burn off, vaporise, or otherwise escape or separate from the surface or combine chemically with other available materials when the powder coating is subject to a subsequent thermal fusing or firing process, or chemical treatment. In vitreous enamelling it is also important that the resulting products of combustion should not interfere with the properties of the vitreous enamel.

According to a particular preferred feature of the invention the powder comprises fine particles of an alkali borosilicate enamelling material, each surface treated to increase its surface resistivity by exposure to an organo-chloro-silane, and reaction with a capable of hydrolyzing on the surface to give a water repellant effect.

Preferably the surface of the particle is treated with an organo-trichloro-silane.

The invention also resides in a vitreous enamelled article produced by use of a powder as defined above.

Figure 4:
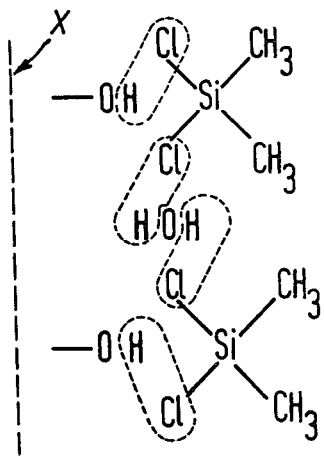
Figure 5:
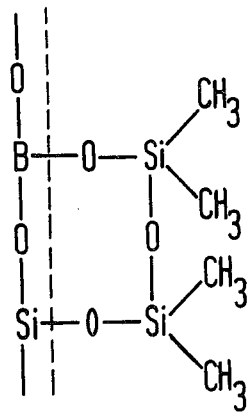
Figure 9:
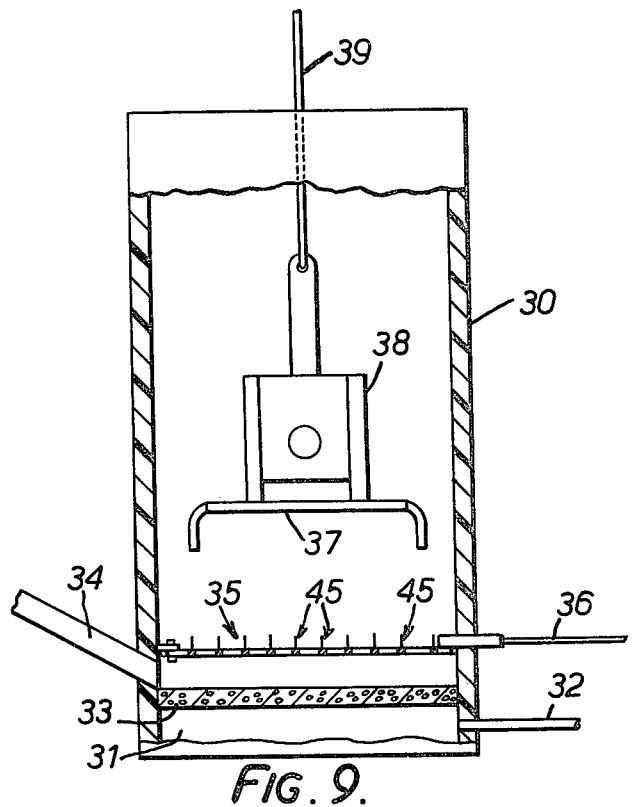
Figure 6:
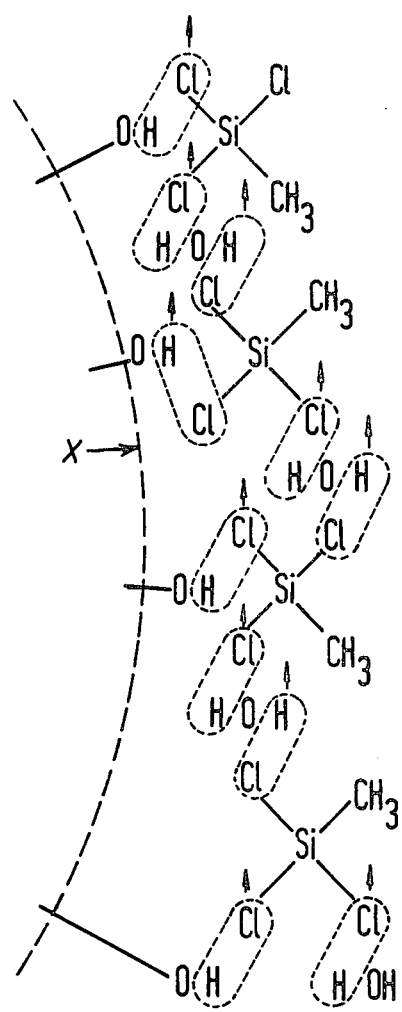
Figure 7:
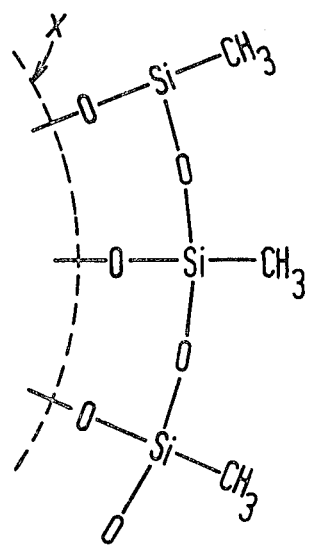
Figure 8:
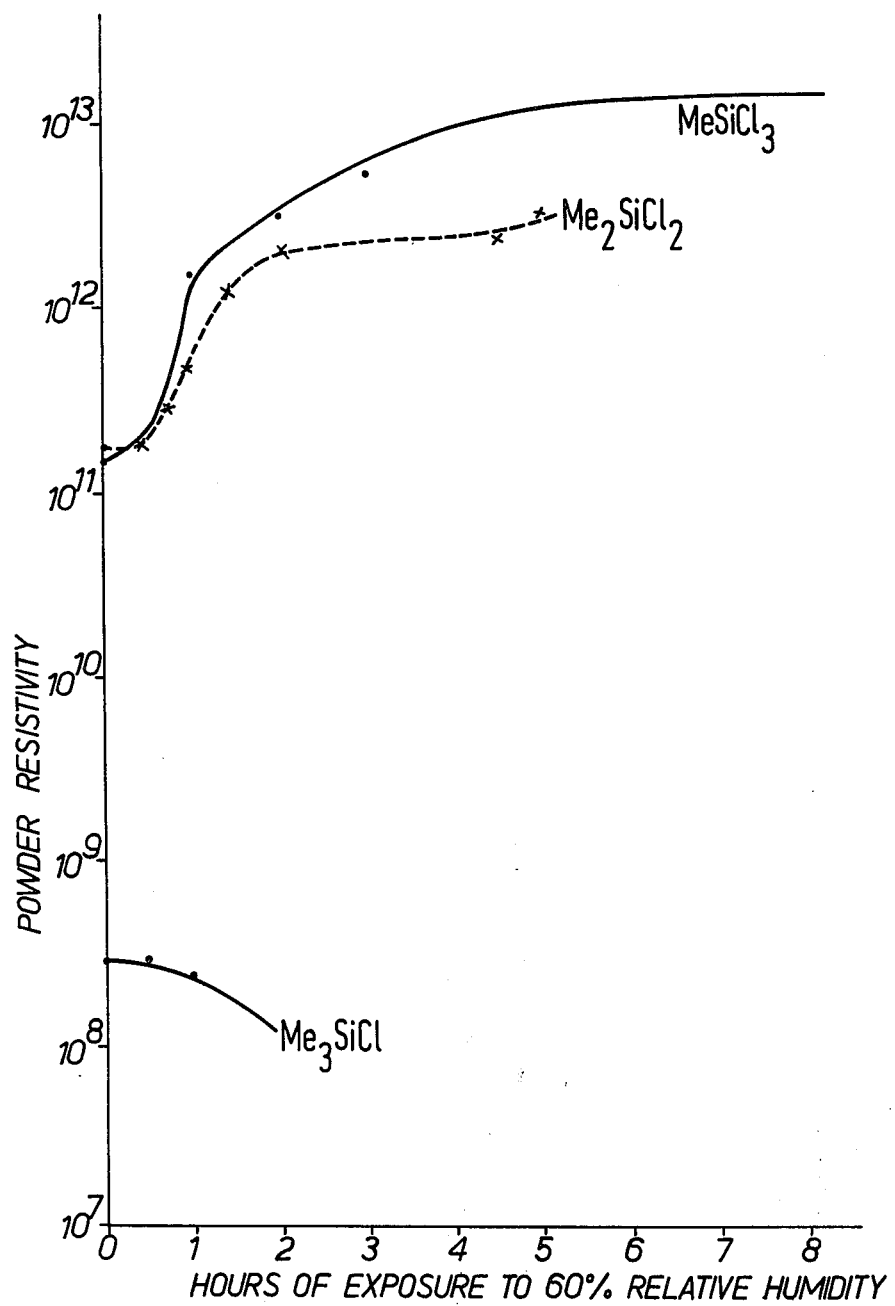

The invention may be performed in various ways and two specific embodiments will now be described by way of example with reference to the accompanying drawings, in which:

FIG. 1 is a diagram illustrating a powder treatment plant according to the invention, FIGS. 2 to 5 represent the supposed chemical structure of the particle surface at successive stages in one process according to the invention, FIG. 6 is a diagram illustrating the supposed molecular structure of the surface layer on a particle of frit, and the molecular changes which occur in another embodiment of the invention, FIG. 7 is a diagram illustrating the final molecular structure of the surface, FIG. 8 is a graph illustrating the surface resistivity of powder treated by various different materials, and FIG. 9 is a diagram illustrating an apparatus for performing the final electrostatic coating process.

In the first example the invention is applied to the electrostatic deposition of a layer of powdered frit to the surface of a metal component such as a steel bath or cooking utensil, which is to be vitreous enamelled. The initial stages in the process are concerned with the treatment of the powdered frit to achieve increased surface resistivity, and subsequently the metal article with the adhering powdered coating is then fired in the conventional manner to produce the vitreous enamel surface.

The preparation of the powdered glass frit is in three stages, referred to here as the "pre-treatment", "encapsulation", and "post-treatment" stages.

In the "pre-treatment" stage the powdered glass frit is very carefully dried, for example in a dry, warm air stream. For this purpose the equivalent of a fluidised bed may be used, as illustrated in FIG. 1, comprising a chamber 10 with a porous supporting surface 11 on which the powder 12 is placed, and means for supplying the warmed dried air at 13 below the surface 11 to pass upwards through the particles and issue at the top 14 of the chamber.

The glass frit may take various different chemical forms, but in this particular example the frit is an alkaliboro silicate material, including for example sodium, potassium, or lithium in addition to boron and silicon, and other minor constituents such as fluorine, cobalt, nickel and manganese. The particle size is preferably between about 5$\mu$ and 25$\mu$, of which approximately 25% of the particles are larger than 23$\mu$ and 25% are smaller than 13$\mu$. After the drying process the resistivity of the powder may be approximately $5 \times 10^{11}$ ohm meters.

In the next "encapsulation" stage the powdered material is agitated in a fluidised bed with a dried air stream passing through the bed. The fluidised bed is conveniently the same fluidised bed as in the first pretreatment stage, and for this purpose the apparatus is equipped also with a rotary mechanical agitator 15, above the porous surface 11. During this agitation dimethyldichlorosilane (DDS) in vapour phase is introduced into the air stream at 16 to contact the fluidised powder. The proportion of DDS required is of the order of 0.1% by weight in relation to the total weight of the powdered frit, but this may be reduced for particles of larger size. The DDS reacts with the surface composition of the particles as explained in more detail below and the process is continued until DDS is detected in the emerging air stream above the fluidised bed at 14: at this stage it can be assumed that the reaction is substantially complete. Measurements at this stage show that the powder resistivity has substantially improved to the order of $3 \times 10^{12}$ ohm meters, but the effect is not yet stable since the surface layers of the particles are still hygroscopic and if moisture is present the resistivity will decay quite rapidly.

In the third "post-treatment" stage the powder is heated in the presence of water vapour, for example at a temperature of about 215° C. for about 3 hours or less. This may be performed in the same fluidised bed as the previous stages, for which purpose the equipment shown in FIG. 1 also has a valve controlled water vapour inlet 17. This results in chemical modification of the powder particle surface, further improves the surface resistivity up to a value of about $2 \times 10^{13}$ ohm meters, and results in a stable, non-hygroscopic surface property, provided of course that the powder material is not subjected to really excessive moisture.

It may be of interest for comparison that the surface resistivity of nylon is of the order of $10^{12}$ ohm meters, and epoxy resins of the order of $10^{13}$ ohm meters. It will be seen that the surface treated frit powder of the present invention is therefore comparable in resistivity with these essentially non-conducting synthetic plastics materials.

It has been found that if the surface resistivity is higher than about $10^{12}$ ohm meters, the powder is easy to spray and the thickness of the deposited powder layer is "self-limiting". This latter self-limiting effect is valuable in many powder coating applications, particularly in vitreous enamelling where excessive thickness of the powder coating can create undesirably thick vitreous enamel. This encapsulation process also improves the free flowing and handling properties of the powder.

Figure 2:
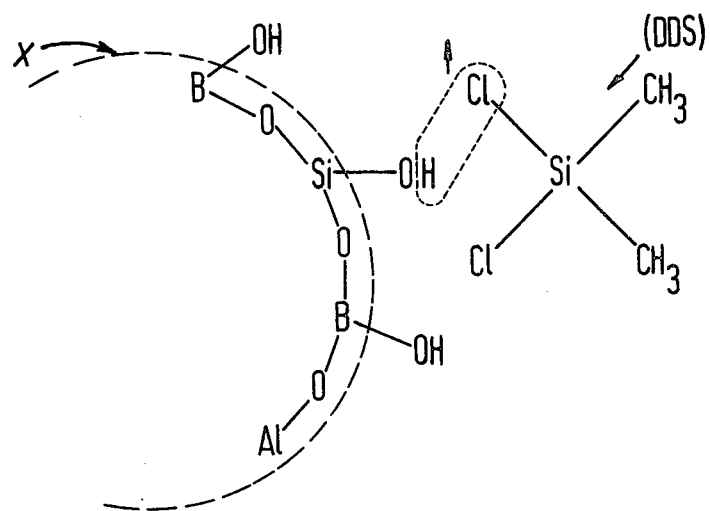

The chemical reactions involved in the creation of the surface coating on the particles may be explained as follows:

In the diagram of FIG. 2 the surface of the frit is indicated at X and the molecular structure of the frit is indicated by a chain consisting of boron, silicon and aluminium atoms with inter-linking oxygen bonds. These atoms near the surface project hydroxyl (OH) groups, which may form as a result of oxygen picking up hydrogen from moisture in the atmosphere, and normally these hydroxyl groups probably result in the low surface resistivity of the basic powdered frit material.

Figure 3:
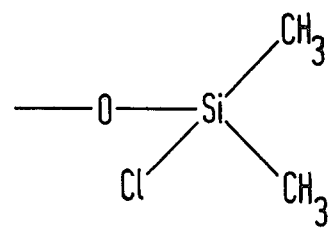

When the DDS vapour is introduced in the encapsulation stage it is believed that one of the chlorine atoms of the DDS molecule combines with the hydrogen in a hydroxyl group and a chemical condensation reaction occurs with elimination of HCl as a gas. A chemical bond forms between the oxygen atom and the silicon, leaving one SiCl linkage free as shown in the diagram of FIG. 3.

In the post-treatment stage it is probable that moisture in the atmosphere reacts with the free Si-Cl linkages in two adjacent molecules and HCl is eliminated, as shown in FIG. 4, to form an Si-O-Si chain, being a form of silicone grouping, as illustrated in FIG. 5.

The result is an impervious molecular layer and importantly, the $CH_3$ groups will burn off when the vitreous enamel firing takes place in the presence of air, at a temperature below that at which the frit itself fuses. The enamel is therefore not contaminated. The $CH_3$ groups react with $O_2$ to produce $CO_2$ and $H_2O$, leaving residual $SiO_2$. The enamel composition is not appreciably affected by this fractional percentage of additional silica.

In the second embodiment of the invention the preparation of the powder involves three stages as in the first example, namely a pre-treatment, an encapsulation and a post treatment stage.

The pre-treatment stage is identical, the powdered glass frit being carefully dried in a fluidised bed. The following encapsulation stage is also similar, the dried frit powder being agitated in the same fluidised bed with a dried air stream, and an organo-halo silane in vapour phase is introduced into the air stream to contact the fluidised powder and react with the surface of the particles.

In this second embodiment however the treatment vapour is a tri-chloro-silane, preferably tri-chloro-methyl-silane,

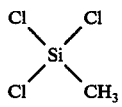

The triple chlorine structure reacts with the surface of the powdered frit as indicated in the accompanying FIG. 6, where it is shown that the atoms on the surface of the particles initially project hydroxyl (OH) Groups, and in the reaction with the vapour it is believed that one of the chlorine atoms combines with the hydrogen in a hydroxyl group and a chemical condensation occurs with elimination of HCl as a gas. This leaves two chloride groups and a methyl group free.

In the next following post-treatment stage, the powder is heated in the presence of water vapour, in the same fluidised bed, as described in the first example. It is believed that in this stage moisture in the atmosphere reacts with the free chloride groups in two adjacent silane molecules, and again HCl is eliminated to form a Si-O-Si chain. It will be noted that as illustrated in FIGS. 6 and 7 this chain is continuous and uninterrupted, and on the actual surface of the particle it is believed that a three-dimensional double linkage effect is produced providing a very effective continuous surface layer which is substantially impervious to water. In the final firing process to produce the vitreous enamel the $CH_3$ groups will burn off below the temperature at which the frit itself fuses and the enamel is therefore not contaminated.

The substance used for the vapour treatment of the powder may take various alternative forms. As explained, a tri-chloro-silane is believed to be particularly advantageous in view of the cross linking effect achieved. Other possibilities by substitution for the organo-constituent, are members of the paraffin and aromatic series, such as the alkyl forms tri-chloro-ethyl-silane, or tri-chloro-butyl-silane, and the vinyl and phenyl equivalents.

Di-chloro-silane as mentioned in the first example of the invention is also effective, though possibly not quite to the same extent, and other possible forms of this are di-chloro-di-ethyl-silane or the butyl, vinyl or phenyl equivalents. Di-chloro-ethyl-vinyl-silane or other permutations are also believed to be effective.

The silane ($siH_4$) is normally a mono-silane but di-silane is another possibility. Instead of silicon it is theoretically possible for other elements to be used to form the basis of the linkage, such as carbon or germanium for example, but for various reasons, including prohibitive cost and contamination of the enamel, these are not thought to be comparable with the silanes.

The accompanying FIG. 8 is a diagram representing the measured surface resistivity of frit particles when subjected to various different treatments, measured against the time of exposure to air at 60% relative humidity.

The top curve represents treatment of powdered frit with tri-chloro-methyl-silane, the next curve relates to treatment with di-chloro-di-methyl-silane and the lowest curve relates to treatment with chloro-tri-methyl-silane. It will be noted that curve A shows an actual improvement in resistivity over an appreciable period and this in practice is a considerable advantage since the prepared treated powder in practice will be exposed to a humid atmosphere for some time before being used. Equivalent di-chloro treatment produces a satisfactory level of resistivity though not quite to the same extent and here the improvement does not continue for the same period, but at least there is no drop in resistivity as occurs in curve C.

In the example described above the encapsulation stage is performed in a fluidised bed, but it has also been found possible, and of some advantage, to perform this treatment in a ball-mill during the later stages of the normal grinding operations on the powdered frit. This tends to avoid agglomeration. The later stages may also be performed in the ball-mill, or the material may be removed to a fluidised bed for these final treatments.

It is found that the resulting powder when sprayed electrostatically with a conventional electrostatic spray gun, or by a fluidised bed technique as described below with reference to FIG. 9, produces excellent adhering powdered layers with self-limiting thickness effects; the eventual vitreous enamel surface layer is of the order of about 0.0025 to 0.003 ins. when fused. This is practically an ideal enamel thickness. The normal enamel firing process is usually at a temperature of about 780° to 860° C. for approximately 4 minutes.

The electrostatic powder coating apparatus illustrated in FIG. 9 comprises a main hollow box-like casing 30, formed of an insulating rigid plastics material, the lower part of the casing being arranged to provide an air inlet chamber 31, with an air inlet duct 32, below a porous air permeable sheet or tile 33, formed for example of a porous polyethylene plastics. The pre-treated powder to be coated is introduced above the tile 33 through a chute 34, and above the tile is positioned a main electrode grid 35, connected to an external high tension terminal 36. An article 37 such as a steel bath, to be coated with the powder, is supported above the electrode 35 by a magnetic chuck 38, whose suspending cable 39 includes a conductor serving to earth the article 37.

The electrode grid 35 comprises a large number of corona points 45 secured by solder or by brazing to an open grid of metallic cross supporting rods, thus providing a substantially uniform electric space charge, but allowing free flow of the particle cloud between the corona points.

It will be understood that the invention may be performed in various other ways and to a variety of different materials.

The invention is also applicable to the treatment of semi-conducting powders to enhance their free-flowing or handling properties, or in any situation where a non-hygroscopic surface is of value, otherwise than in electrostatic powder coating techniques, e.g. for fluidised bed or bulk handling applications.

We claim:
1. A method of applying a coating of a vitreous enamel to a conducting base surface, using a powder comprising small particles of an alkali-boro silicate vi- treous enamel frit, between 5μ and 200μ in size, which have been surface treated by exposure to a chloro-silane compound of the formula $$R_n - SiCl_{4-n}$$

where R is an aklyl, phenyl or vinyl group and $n$ is 1,2, or 3, and also reacted with water vapor to give increased particle surface resistivity of at least $10^{12}$ ohm meters, the method comprising the stages of charging the particles electrostatically and subjecting the particles to an electric field causing the said particles to migrate towards and adhere as a coating to said conducting base surface, and the said powder coating is subjected to a thermal fusing operation causing said powder to vitrefy.

2. A method according to claim 1, in which the organic constituents of the surface layer of each particle burn off or evaporate when the powder coating is subject to the subsequent thermal fusing.

3. A method according to claim 1, in which $n=1$.

4. A method according to claim 1, in which the treated surface layer of each particle comprises a cross-linked silicone material.